United States Patent [19]

Anand et al.

[11] Patent Number: 5,037,864

[45] Date of Patent: Aug. 6, 1991

[54] SEMI-CONTINUOUS PROCESS FOR THE PREPARATION OF POLYURETHANE-UREA AQUEOUS DISPERSIONS

[75] Inventors: Joginder N. Anand, Clayton; Sven H. Ruetman, Walnut Creek, both of Calif.

[73] Assignee: The Dow Chemical Company, Midland, Mich.

[21] Appl. No.: 378,532

[22] Filed: Jul. 11, 1989

[51] Int. Cl.$^5$ ............................................. C08G 18/12
[52] U.S. Cl. .................................. 523/348; 524/839; 524/840
[58] Field of Search ................... 524/839, 840; 523/348

[56] References Cited

U.S. PATENT DOCUMENTS

| | | | |
|---|---|---|---|
| 3,437,624 | 4/1969 | Dawn et al. | 260/29.2 |
| 3,835,081 | 9/1974 | Remly | 260/29.2 |
| 3,870,684 | 3/1975 | Witt et al. | 260/75 |
| 3,988,278 | 10/1976 | Bartizal | 260/29.2 |
| 4,172,191 | 10/1979 | Nachtkamp | 528/61 |
| 4,269,748 | 5/1981 | Nachtkamp | 260/29.2 |
| 4,387,181 | 6/1983 | Brown et al. | 524/714 |
| 4,507,431 | 3/1985 | Stutz et al. | 524/840 |
| 4,701,480 | 10/1987 | Markusch | 523/340 |
| 4,745,151 | 5/1988 | Noll et al. | 524/591 |

Primary Examiner—Maurice J. Welsh
Assistant Examiner—Rachel F. Johnson

[57] ABSTRACT

A semi-continuous process for the preparation of polyurethane ionomer or polyurethane-urea ionomer aqueous dispersions which comprises:

A. in a first reaction zone contacting (i) an excess of an aliphatic or cycloaliphatic diisocyanate, or mixture of an aliphatic or cycloaliphatic diisocyanate with an aromatic diisocyanate; (ii) an organic polyol, and (iii) a difunctional isocyanate-reactive component containing an ionic group or potential ionic group, under conditions such that an isocyanate terminated ionic prepolymer is formed; with the proviso that where an aromatic diisocyanate is used the equivalents of aromatic diisocyanate used are less that the equivalents of the organic polyol and difunctional isocyanate-reactive component;

B. transferring the prepolymer to a second reaction zone;

C. in the first reaction zone or the second reaction zone contacting the prepolymer with a neutralizing agent under conditions such that the ionic groups are neutralized;

D. adding water to the second reaction zone until a prepolymer in water emulsion with a particle size of from about 300 Å to about 10,000 Å is formed;

E. adding to the second reaction zone a hydrocarbon polyamine extender, a solution of a hydrocarbon extender, or a catalyst which facilitates the chain extension of the prepolymer by water under conditions such that a polyurethane or polyurethane-urea ionomer is formed; and F. removing the polyurethane or polyurethane-urea ionomer polyurethane-urea ionomer from the second reaction zone.

27 Claims, 4 Drawing Sheets

SEMI-CONTINUOUS PROCESS FOR THE PREPARATION OF POLYURETHANE-UREA AQUEOUS DISPERSIONS

FIELD OF THE INVENTION

This invention relates to water borne ionic polyurethane-ureas and polyurethanes and is more particularly concerned with an improved process for the preparation of ionic polyurethane-ureas.

DESCRIPTION OF THE PRIOR ART

Stable aqueous dispersions of polyurethane-ureas and polyurethanes containing chemically incorporated anionic or cationic groups have long been known to be useful in various coating applications. The coatings and sizings prepared from the dispersions have excellent chemical resistance, abrasion resistance, toughness, and the like.

D. Dieterich et al., as early as 1970, published one of the first technical reviews on ionic polyurethane-urea aqueous dispersions: see *Angewante Chemie Intn'l.*, 9, pp. 40–50 (1970). This was followed by a comprehensive review by the same author in *Progress In Organic Coatings*, 9, pp. 218–340 (1981). For the most part, the polymers are prepared from components which are essentially difunctional in both isocyanate and isocyanate-reactive ingredients. This means the polymers are essentially linear and organic solvent soluble in their final form. However, cross-linked polyurethane-urea aqueous dispersions are known as noted below.

Witt, U.S. Pat. No. 3,870,684, discloses aqueous dispersions of polyurethane-ureas wherein the cross-linking is effected by mixing as a solution in an organic solvent an isocyanate terminated prepolymer having ionic groups with an aqueous solution of an aliphatic polyamine containing a total of at least three primary and/or secondary amine groups of which at least two are primary. A preferred method of forming the dispersion involves diluting the polyurethane mass, which carries salt-type groups and is dissolved in a polar solvent, with about 70 to about 150 percent of its weight of water, containing polyamine and then largely or completely distilling off the organic solvent. Alternatively, the organic polyurethane solution may be added to a given quantity of water while stirring vigorously and the organic solvent may be removed at the same time or afterwards. It is also possible to inject the still liquid polyurethane mass free of solvent into water, e.g., by means of nozzles, with or without the use of compressed air, particles of the size of dispersion particles being then formed immediately. However, the method of preparation requires organic solvents and the need for highly functional polyamines.

Hangauer, U.S. Pat. No. 4,203,883, discloses cross-linked polyurethane-ureas closely related to those set forth in U.S. Pat. No. 3,870,684 cited supra. The cross-linking is effected by reacting an isocyanate terminated polyurethane prepolymer containing tertiary amine neutralized carboxylic acid groups with a triamine or mixture of triamine with diamine. Again, the employment of organic solvent is favored at least in the preparation of the prepolymer component. It is disclosed that chain extension is frequently conducted in an aqueous medium such that the dispersion of the urea-urethane polymer in water is directly formed. The polyamine is preferably gradually added to the reaction medium which contains the urethane prepolymer in order to prevent the occurrence of localized high concentrations of the added reactant which may lead to forming ureaurethanes having an unduly broad molecular weight range. In the examples, the simultaneous slow addition of polyamine and water is disclosed.

Nachtkamp, U.S. Pat. No. 4,172,191, discloses the preparation of polyisocyanate addition products containing carboxylate and amide groups, which may also contain urethane groups, by the reaction of organic polyisocyanates with polyesters which contain carboxylate groups, free carboxyl groups, and hydroxyl groups, to produce a prepolymer, followed by chain lengthening. The formation of the prepolymer may be carried out in the presence of organic solvents. Neutralization is most easily carried out by adding tertiary amines to the reaction mixture. The chain lengthening is carried out by water or by a mixture of water and a polyamine or hydrazine. The prepolymer may be dispersed in water before adding the chain lengthening agent. This step may be carried out in the presence of solvents used for the preparation of the prepolymer.

Generally speaking, the prior art teaches a preference for the use of organic solvents throughout the preparation of the aqueous dispersions. The prior art shows the preparation of aqueous dispersions of polyurethane-ureas using primarily batch processing. Such batch processing presents problems in commercial processing, in particular each step is not separately controlled in the optimum manner.

What is needed is a process for the continuous production of aqueous dispersions of polyurethane-ureas which allows control of each step separately without the use of solvent.

SUMMARY OF THE INVENTION

The present invention is a semi-continuous process for the preparation of polyurethane ionomer or polyurethane-urea ionomer aqueous dispersions which comprises:

A. in a first reaction zone contacting (i) an excess of: (ii) an organic polyol, and (iii) a difunctional isocyanate-reactive component containing an ionic group or potential ionic group under conditions such that an isocyanate terminated ionic prepolymer is formed:

B. transferring the prepolymer to a second reaction zone:

C. in the first reaction zone or the second reaction zone contacting the prepolymer with a neutralizing agent under conditions such that the ionic groups are neutralized;

D. adding water to the second reaction zone until a prepolymer in water emulsion with a particle size of from about 300Å to about 10,000Å is formed;

E. adding to the second reaction zone; a hydrocarbon polyamine extender, a solution of a polyamine hydrocarbon extender, or a catalyst which facilitates the chain extension of the prepolymer by water, under conditions such that a polyurethane or polyurethane-urea ionomer is formed; and F. removing the polyurethane or polyurethane-urea ionomer from the second reaction zone.

This process allows the continuous production of polyurethane-urea ionomer or polyurethane ionomer aqueous dispersions without organic solvent with more accurate control of each step.

The ionic aqueous dispersions of this invention, by virtue of their good film-forming properties are useful in a wide variety of coating applications. The fact that the coatings are transparent and have good tensile properties broadens the applications in which they can be employed. Typically, they can be used as sizing in the manufacture of high grade paper, coatings and impregnants for textiles, leather, fibers, and the like. However, the toughness and clarity of the films make them particularly useful as protective coatings for other plastic articles made from such materials as polycarbonates, acrylics, and the like. Window glazing, security glass and aircraft canopies are but a few of the uses to which the present films can be applied.

DEFINITIONS

The term "hydrocarbon" as used herein with respect to the polyamine extender component means a hydrocarbon residue having from about 2 to about 20 carbon atoms remaining after the replacement of the appropriate number of hydrogen atoms by primary or secondary amine groups: inclusive of said hydrocarbon residue are aliphatic of $C_2$ to $C_{10}$, cycloaliphatic of $C_5$ to $C_{18}$, aromatic of $C_6$ to $C_{20}$, and the like.

The term "aliphatic diisocyanate" means an organic isocyanate containing two aliphatically bound isocyanate groups wherein the aliphatic divalent residue is an alkylene radical having from about 6 to about 12 carbon atoms, inclusive, such as hexamethylene, heptamethylene, octamethylene, nonamethylene, decamethylene, undecamethylene, dodecamethylene, and isomeric forms thereof. Another example is tetramethylxylene di-isocyanate.

The term "cycloaliphatic diisocyanate" means an organic diisocyanate containing two cycloaliphatically bound isocyanate groups wherein the cycloaliphatic divalent residue contains one or two cycloalkylene radicals each cycloalkylene having from about 5 to about 8 carbon atoms, inclusive, such as cyclopentylene-1,3, 4-methylcyclopentylene-1,3, cyclohexylene-1,3, cyclohexylene-1,4, 2-methylcyclohexylene-1,4, 2,5-dimethylcyclohexylene-1,4, cycloheptylene-1,3, cycloheptylene-1,4, 6-methylcycloheptylene-1,4, cyclooctylene-1,3, cyclooctylene-1,4, cyclooctylene-1,5, and the like; 4,4'-methylenebis(cyclohexylene), 4,4'-isopropylidenebis(cyclohexylene), 4,4'-dicyclohexylene, and the like.

The term "aromatic diisocyanate" means an organic isocyanate containing one or two aromatically bound isocyanate groups wherein the aromatic divalent residue is an arylene or alkoxylene moiety having from about 6 to about 20 carbon atoms, inclusive, such as phenylene, benzylene, napthylene and the like.

The term "difunctional isocyanate-reactive component" means any organic compound carrying two separate groups each capable of reacting with an isocyanate group because of active hydrogens according to the Zerewitinoff test, such as —OH, —NH$_2$, —SH, —COOH, and the like.

The term "ionic group or potential ionic group" means a group either already in an anionic or cationic form or else, by neutralization with a reagent, readily converted to said anionic or cationic form respectively. Illustrative of such potential anionic groups (and neutralized form) are —COOH(—COO$^\ominus$), —SO$_2$OH(—SO$_2$O$^\ominus$), and =POOH(=POO$^\ominus$); illustrative of such potential cationic groups (and neutralized form) are ≡N(≡N—$^\oplus$), ≡P(≡P—$^\oplus$), and =S(=S—$^\oplus$).

The term "dispersion" as used herein means a two-phase system comprising the ionic polyurethane-urea as the dispersed phase in the continuous aqueous phase. It is to be understood that the dispersed phase can be a liquid or a solid. Accordingly, the present products comprehend both emulsions and suspensions.

DETAILED DESCRIPTION OF THE INVENTION

The process for the preparation of aqueous dispersions of polyurethane-urea ionomers or polyurethane ionomers involves generally, first, the preparation of a prepolymer from (i) an excess of diisocyanate, (ii) an organic polyol, and (iii) a difunctional isocyanate-reactive component containing an ionic group or potential ionic group. Secondly, the ionic groups of the prepolymer are neutralized, if they have not been previously neutralized. The difunctional isocyanate-reactive component containing an ionic group or potential ionic group (iii) may be neutralized prior to formation of the prepolymer. Alternatively, the neutralization agent may be added to the reaction mixture during the formation of the prepolymer. After formation of the prepolymer, and neutralization if necessary, the prepolymer is dispersed in water to form a prepolymer in water dispersion. Thereafter, the prepolymer is chain extended with a hydrocarbon amine or reacted with a catalyst which catalyzes the reaction of water with the prepolymer such that a water induced chain extension of the prepolymer will take place.

The prepolymer formation step is performed in a batch reactor. The steps of dispersion formation and chain extension may be performed in a batch or continuous reactor. The neutralization may occur in either reactor or third reactor which may be batch or continuous. The limiting step is the formation of the prepolymer, as the dispersion of the prepolymer and the chain extension proceed quite fast. This allows the performance of the latter two steps in a continuous fashion.

In general one or more, preferably two or more, reaction zones adapted for the formation of the prepolymer are used to form the prepolymer. After formation of the prepolymer and neutralization when the prepolymer is transferred to a reaction zone adapted for the formation of the polyurethane-urea ionomer aqueous dispersion. Where two or more reaction zones adapted for the formation of the prepolymer are used, the prepolymer is transferred to the reaction zone adapted for the formation of the polyurethane-urea ionomer or polyurethane ionomer aqueous dispersion in a sequential manner. In such embodiment, the prepolymer reactors are operated such that they are charged sequentially such that the intermediate is ready for transfer as the second reaction zone is available to accept such intermediate.

In one embodiment, there is one reaction zone adapted for the formation of the prepolymer and one reaction zone adapted for the formation of the polyurethane-urea or polyurethane ionomer aqueous dispersion which is a batch reactor. In this embodiment, the prepolymer once formed is transferred to the second reactor, wherein the water dispersion and chain extension are performed sequentially and the product is removed before the next batch of prepolymer is ready for transfer. Neutralization if necessary may be performed in either reactor.

In another embodiment, one reaction zone adapted for the formation of the prepolymer is used and one continuous reactor is used for the dispersion and the chain extension. In this embodiment the prepolymer once formed is transferred to a holding vessel from which the prepolymer is fed continuously to the continuous reactor for water dispersion and chain extension. Preferably, the prepolymer is continuously passed into and through the continuous reactor where there are two zones wherein the first zone is adapted for addition of the water to the prepolymer to form the dispersion, and the second zone is adapted for the chain extension of the prepolymer to give the polyurethane-urea or polyurethane ionomer aqueous dispersion. In the first reaction zone water is added with mixing continuously as the prepolymer passes through the reactor. In the second zone, the hydrocarbon polyamine is added neat, or in an aqueous dispersion or solution, continuously to the prepolymer as it passes through the second zone. Alternatively, on aqueous solution of a polyurethane catalyst may be added in this second zone to affect water induced chain extension of the prepolymer. The flow of the prepolymer through the continuous reactor can be set to match the transfer of prepolymer from the prepolymer reactor to the holding vessel, such that all the prepolymer is passed to the continuous reactor during the time that the next batch of prepolymer is being prepared.

In another embodiment, two or more batch reactors adapted for the formation of the prepolymer are used and a continuous reactor is used for the preparation of the water dispersion and chain extension. Preferably, the prepolymer is continuously passed into and through the continuous reactor where there are two zones, the first zone adapted for addition of the water to the prepolymer to form the dispersion, and the second zone adapted for the chain extension of the prepolymer to give the polyurethane-urea or polyurethane ionomer aqueous dispersion. In the first reaction zone, water is added with mixing continuously as the prepolymer passes through the reactor. In the second zone, the hydrocarbon polyamine is added neat, or in an aqueous dispersion or solution, continuously to the prepolymer as it passes through the second zone. Alternatively, a catalyst for water chain extension is added in this zone. In this embodiment, the prepolymer is sequentially transferred to the continuous reactor such that a continuous flow of prepolymer is fed to the continuous reactor.

Preferably, the diisocyanate, organic polyol, and difunctional isocyanate-reactive component containing an ionic group or potential ionic group are contacted in the absence of a solvent. This contacting occurs with mixing, such mixing is achieved by a means which provides uniform mixture such means well known in the art. In one preferred embodiment, such mixing may be achieved by a slow stirring agitator in a Pfaulder type reactor, where temperature can be controlled. Reaction times for the prepolymer formation are affected by the batch size, reactor temperature, mixing efficiency, and presence or absence of catalyst. Generally, reaction times are long enough to allow completion of the prepolymer formation. Preferred reaction times are between about 20 and about 150 minutes. The reactants are preferably contacted at about ambient temperature. Thereafter, the reaction mixture may be heated to a temperature of between 20 and about 100° C.

If necessary, the prepolymer is neutralized by contacting it with a compound which converts the ionic moieties to the salt form. Preferably, tertiary amines are used. It may be preferable to cool the prepolymer before neutralization. Such cooling is advisable where a low boiling tertiary amine is used, or where there is a risk of unwanted reaction due to the reactivity of the materials present. Temperatures for neutralization are preferably between 20° C. and about 100° C.

The dispersion of the prepolymer in water involves the addition of water to the prepolymer. Generally, the water is added until a phase inversion occurs to give a prepolymer in water dispersion. It is preferable that the dispersion take place at relatively low temperatures to prevent the water from chain extending the prepolymer. The time for dispersion is sufficient to allow formation of a stable prepolymer in water dispersion with a particle size of between about 300Å to about 10,000Å, more preferably between about 300Å to about 3,000Å. The time depends upon the style of reactor and how efficient the mixing is. In a batch reactor the time for dispersion is between about 30 seconds and about 60 minutes, more preferably between about 5 minutes and about 30 minutes. In a continuous process the residence time prepolymer in the dispersion zone is between about 30 seconds and about 10 minutes. Mixing is achieved by contacting the reactants under shear designed to generate the desired particle size. Such methods are known in art. In one preferred embodiment, a high speed agitator designed for providing good shear to form and control the desired particle size is used.

The chain extension is effected by contacting the prepolymer dispersion with a hydrocarbon polyamine or a catalyst, which catalyzes the reaction of water with the prepolymer such that water chain extends the prepolymer. This contacting can take place in a batch reactor by adding the hydrocarbon polyamine or catalyst, or a solution or dispersion of the hydrocarbon polyamine or catalyst, to the reactor after the dispersion of the prepolymer in the water. In the embodiment, where the hydrocarbon polyamine is the chain extender, the addition of the polyamine should occur shortly after formation of the dispersion so as to reduce the risk of chain extension by the water. The time required in a batch reactor is controlled by the size of the reactor and the mixing of the reactor. Generally, the time required is that time necessary for the completion of the conversion of the prepolymer to a polyurethane-urea or polyurethane. Preferably, the time is between about 30 seconds and about 30 minutes, more preferably between about 5 minutes and about 20 minutes. In a continuous process, the prepolymer dispersion is flowed through a reaction zone where the polyamine or catalyst is added to the dispersion under conditions to form a polyurethane or polyurethane-urea ionomer. In a continuous process, the residence time of prepolymer in the chain extension zone is between about 30 seconds and about 10 minutes. Mixing is achieved by means well known in the art. For example, mixing may be affected by controlling the speed of the agitator to maintain the emulsion and prevent coalescence of the particles.

The preparation of the aqueous dispersions of the ionic polyurethane or polyurethane-ureas is carried out using any of the conventional conditions and ingredients known to those skilled in the art. Typical preparative methods are disclosed in the U.S. Pat. Nos. 3,870,684; 4,108,814: 4,203,883: 4,408,008; and 4,501,852 whose disclosures relative thereto are incorporated herein by reference.

The diisocyanates (i) which can be employed for the isocyanate terminated prepolymer (A) preparation are defined above. Illustrative but non-limiting of the diisocyanates are 1,6-hexamethylene diisocyanate, 1,7-heptamethylene diisocyanate, 1,8-octamethylene diisocyanate, 1,9-nonamethylene diisocyanate, 1,10-decamethylene diisocyanate, 1,11-undecamethylene diisocyanate, 1,12-dodecamethylene diisocyanate, 2,2,4-trimethylhexamethylene diisocyanate, 2,4,4-trimethylhexamethylene diisocyanate, tetramethylene xylene diisocyanate, and the (3-isocyanatopropoxy)-(3-isocyanatopropyl)arylenes such as 1-(3-isocyanatopropoxy)-4-(3-isocyanatopropyl)benzene described in U.S. Pat. No. 4,051,166, 1,4-bis(2-isocyanatoethyl)cyclohexane, and the like; isophorone diisocyanate otherwise identified as 1-isocyanato-3-isocyanatomethyl-3,5,5-trimethylcyclohexane; and cycloaliphatic diisocyanates such as methylenebis(cyclohexyl isocyanate) including the 4,4'-isomer, the 2,4'-isomer, and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexyl diisocyanate, 1-methyl-2,6-cyclohexylene diisocyanate, 4,4'-isopropylidenebis(cyclohexyl isocyanate), 4,4'-diisocyanatodicyclohexyl, 1,4-diisocyanatocycloheptylene, 1,4-diisocyanatocyclooctylene, and the like. Aromatic diisocyanates which may be useful include the following, 1,5-naphthylene diisocyanate, 4,4'-diphenylmethane diisocyanate, 4,4'-diphenyldimethylmethane-diisocyanate, di- and tetralkyldiphenylmethane diisocyanate, 4,4'-dibenzyl diisocyanate, 1,3-phenylene diisocyanate, 1,4-phenylene diisocyanate, and toluylene diisocyanate.

Preferred as a group are the cycloaliphatic diisocyanates and preferred within this group are the methylenebis(cyclohexyl isocyanates) with the 4,4'-isomer being particularly preferred.

Aromatic diisocyanates may be used alone or in admixture with aliphatic or cycloaliphatic di-isocyanates. Preferably, where aromatic diisocyanates, those with the isocyanate moieties on the aromatic ring, are used, they are used in combination with aliphatic or cycloaliphatic diisocyanates. In such embodiment, the equivalents of aromatic diisocyanate are preferably less than the equivalents of the organic polyol and the difunctional isocyanate reactive compound which are reactive with isocyanate moieties. It is believed that the prepolymers will under such circumstances have terminal aliphatic or cycloaliphatic isocyanate moieties. The aliphatic and cycloaliphatic isocyanate moieties are less reactive than aromatic moieties and therefore greater control of the chain extension can be had.

The organic polyols (ii) can be any of the high molecular weight polyols exemplified in the incorporated references above. Preferably, the molecular weight falls in the range of from about 500 to about 6,000, more preferably, from about 1,000 to about 3,000. The term "molecular weight" as used herein means the number average molecular weight as determined by end-group analysis or other colligative property measurement.

Exemplary of the diols which can be employed are: polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with difunctional amine-terminated polyethers and amino-terminated polybutadiene-acrylonitrile copolymers.

Illustrative of polyether diols are polyoxyethylene glycols, polyoxypropylene glycols, polyoxybutylene glycols which, optionally, have been capped with ethylene oxide residues, random and block copolymers of ethylene oxide, propylene oxide, and butylene oxide, random and block copolymers of tetrahydrofuran and ethylene oxide and or propylene oxide, and products derived from any of the above by reaction with difunctional carboxylic acids or esters derived from said acids in which latter case ester interchange occurs and the esterifying radicals are replaced by polyether polyol radicals. The preferred polyether polyols are random and block copolymers of ethylene and propylene oxide of functionality approximately 2.0 and polytetramethylene glycol polymers.

Illustrative of polyester diols are those prepared by polymerizing s-caprolactone using an initiator such as ethylene glycol, ethanolamine and the like, and those prepared by esterification of polycarboxylic acids such as phthalic, terephthalic, succinic, glutaric, adipic, azelaic and the like acids with dihydric alcohols such as ethylene glycol, butanediol, cyclohexanedimethanol and the like.

Illustrative of the amine-terminated polyethers are the aliphatic primary diamines structurally derived from polyoxypropylene glycols Polyether diamines of this type are available from Texaco under the trademark JEFFAMINE.

Illustrative of polycarbonates containing hydroxyl groups are those prepared by reaction of diols such as propane-1,3-diol, butane-1,4-diol, hexan-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like: see, for example, U.S. Pat. No. 4,057,595.

Illustrative of the dihydroxy-terminated polybutadiene copolymers are the compounds available under the trade name Poly BD Liquid Resins from Arco Chemical Company. Illustrative of the dihydroxy- and diamine-terminated butadiene/acrylonitrile copolymers are the materials available under the trade name HYCAR hydroxyl-terminated (HT) Liquid Polymers and amine-terminated (AT) Liquid Polymers, respectively.

The most preferred diols comprise the preferred random and block polyether diols and polytetramethylene glycols set forth above otherwise referred to as polyalkyleneoxy diols and with polyethyleneoxy-capped polypropyleneoxy diols being most specifically preferred.

In another embodiment, the polyol can be a triol. The triol can be any of the organic polyols known in the urethane art to be trihydric in functionality and which fall into the molecular weight ranges set forth above. The triols can be identically obtained to those diols described above except for the use of initiators and starting materials leading to trihydroxy functionality. For example, polyether triols are readily available or easily prepared in the form of polyoxyethylene triols, polyoxypropylene triols, polyoxybutylene triols, the latter two optionally capped with ethyleneoxy residues, including random and block copolymers. All of these polyether triols are generically identified as polyalkyleneoxy triols and are prepared by the reaction of the corresponding ethylene, propylene, butylene oxides with trifunctional initiators such as glycerine, trimethylolpropane, and the like; optionally, the triols can be prepared from tetrahydrofuran and a trifunctional starter to yield the corresponding polytetramethyleneoxy triols; polyester triols while more difficult to synthesize with the overall trifunctionality than the polyalkyleneoxy triols above, are nevertheless still useful as triol components: typical trifunctional polyester triols are those prepared from s-caprolactone with an initiator such as glycerine, trimethylolpropane and the like; further illustrative examples of triols include polycarbonate triols prepared by reaction of triols such as trimethylolpropane or glycerine with diphenylcarbonate or phosgene: and mixtures of any of the above triols as the major component (greater than 50% w/w) with trifunctional amine-terminated polyethers.

A preferred class of triols comprises the polyalkyleneoxy triols, particularly those having a molecular weight of from about 500 to about 3,000. Even more preferred are the polyethyleneoxy-capped polypropyleneoxy triols having a molecular weight from about 500 to about 2,000.

In one preferred embodiment, the component (ii) for preparing said isocyanate terminated ionic prepolymer comprises a mixture of at least one diol with at least one triol. The proportions in which the triol is to be employed will vary somewhat according to its molecular weight. Branching and eventual cross-linking of the final polymer will be controlled largely by the molecular weight factor. As molecular weight of the triol decreases, then branching in the prepolymer leading to possible cross-linking therein, and, most assuredly, in the final polyurethane or polyurethane-urea ionomer will occur. Accordingly, the ultimate film properties desired will dictate triol molecular weight and the proportions in which to use it. Advantageously, the triol can be present in the mixture in up to about 50 hydroxyl equivalent percent. That is to say, of the total hydroxyl equivalents employed in the prepolymer preparation, up to about 50 percent can be contributed by the triol component. Above the 50 percent level will generally lead to visible gel formations in the aqueous dispersions. Preferably, the polyol mixture (ii) comprises from about 5 to about 50 equivalent percent of said triol and from 95 to 50 percent of said diol. More preferably, the triol falls in a range of from about 10 to about 40 percent with diol being 90 to 60 percent.

Known difunctional chain extenders such as the aliphatic $C_2$ to $C_{10}$ glycols as typically exemplified by ethylene glycol, 1,4-butanediol, 1,6-hexanediol, and the like are not specifically excluded from the present polymers. At the same time, their use is not particularly necessary in the prepolymer (A) preparation unless particularly high hardness is desired in the final films.

The difunctional isocyanate-reactive components (iii) are necessary to provide for the water dispersibility of both the prepolymer and final polyurethane or polyurethane-urea ionomer as discussed typically in U.S. Pat. No. 3,479,310. Such components contain an ionic group or potential ionic group as defined above and include any of those compounds disclosed in U.S. Pat. No. 4,408,008, particularly column 6, line 63 through column 7, line 57 whose disclosure with respect to these compounds is incorporated herein by reference. Additionally, the U.S. patent disclosures recited in this referenced disclosure including 3,412,054; 3,419,533; 3,479,310; and 4,108,814 are also incorporated herein by reference with respect to the difunctional isocyanate-reactive ionic or potential ionic compounds disclosed.

As noted and defined above, the ionic definition includes both anionic and cationic character. Additionally, the term "neutralize" as used herein for converting potential ionic to ionic groups refers not only to neutralization using true acids and bases but also includes quaternarization and ternarization. The potential anionic groups typically include carboxylic acid groups, sulfonic acid groups, and phosphoric acid groups which when incorporated into the difunctional isocyanate-reactive component (iii) can be neutralized before, during, or after the prepolymer formation to form the corresponding carboxylate anion, sulfonate anion, and phosphate anion by treatment with such inorganic or organic bases as sodium hydroxide, potassium hydroxide, potassium carbonate, ammonia, tertiary amines such as triethylamine, tripropylamine, tributylamine, and the like. In respect of the potential cationic groups, these typically include tertiary amine, phosphine, and sulfide groups which when incorporated into the difunctional isocyanate-reactive component (iii) can be quaternated or ternated as the case may be by neutralization or quaternarization of the tertiary amine, or reacting the phosphine or sulfide with compounds capable of alkylating the phosphine or sulfide groups. Sometimes it is more convenient to have the precursor phosphine or sulfide groups as a separate reagent with the actual quaternizing or ternarizing moiety in the difunctional component (iii).

The isocyanate-reactive groups themselves as defined above are those having active hydrogen atoms and include hydroxyl, amino, thiol, and carboxylic acid. Preferred of the functional groups are the dihydroxy and diamino compounds with dihydroxy functionality most preferred.

Illustrative but non-limiting of the compounds containing a potential anionic (ionic) group are tartaric acid (mono-, or di-sodium salt), 2,6-dihydroxy benzoic acid (sodium salt, potassium salt, triethylammonium salt), 2,8-dihydroxynaphthoic acid-3 (sodium salt, potassium salt, triethylammonium salt), 3,4-diaminobenzoic acid (sodium salt, potassium salt, triethylammonium salt), 1,7-dihydroxynaphthalenesulfonic acid-3 (sodium salt, potassium salt, triethylammonium salt), 1,8-dihydroxynaphthalenedisulfonic acid-2,4 (sodium salt, potassium salt, triethylammonium salt), 2,4-diaminotoluenesulfonic acid-5 (sodium salt, potassium salt, triethylammonium salt), the sulfonate diols described in U.S. Patent 4,108,814 already incorporated herein, bis($\beta$-hydroxyethyl)phosphinic acid (sodium salt, potassium salt, triethylammonium salt), and the like: illustrative of the compounds containing a potential cationic (ionic) group are methyldiethanolamine (hydrochloride salt, acetic acid salt), N,N-di(2-hydroxypropyl)aniline (hydrochloride salt, acetic acid salt), N-cyclohexyl-N-(3-aminopropyl)propanol-2-amine (hydrochloride salt, acetic acid salt), ethyldiethanolamine (hydrochloride salt, acetic acid salt), glycerol-$\alpha$-bromohydrin quaternated with tributylamine (ammonium salt), or triethyl phosphine (phosphonium salt), glycerol-$\alpha$-bromohydrin ternated with dimethyl sulfide (sulfonium salt), and the like.

Preferred for the component (iii) is a class of dihydroxy alkanoic acids described in U.S. Pat. No. 3,412,054 already incorporated herein. When they are neutralized with any of the inorganic or organic bases discussed in the incorporated references and also above, they result in the preferred anionic moieties. Accordingly, the preferred component (iii) is a carboxylic acid containing diol which can be neutralized with an inorganic or organic base to form said ionic group before, during or after said prepolymer formation. The most preferred dihydroxy alkanoic acids are the $\alpha,\alpha$-dimethylol alkanoic acids having the formula $QC(CH_2OH)_2COOH$ wherein Q is hydrogen or $C_1$ to $C_8$ alkyl (preferred are those acids with $C_1$ to $C_4$). Preferred as the neutralizing agents are the aliphatic $C_2$ to $C_4$ tertiary amines inclusive of triethylamine, tripropylamine, tributylamine, triisopropylamine, and the like, and aqueous or anhydrous ammonia. A most preferred embodiment of the present invention is when the carboxylic acid group is neutralized with the amine after said prepolymer formation and prior to forming an aqueous dispersion thereof.

The proportions in which component (iii) is to be employed is not particularly critical except to the extent that it be sufficient to result in good dispersion of the prepolymer and final polyurethane-urea in water. Advantageously, the component is employed within a range of proportions such that the milliequivalents of ionic groups per 100 grams of prepolymer (A) falls within a range of from about 10 to about 150, preferably about 20 to 100, most preferably about 25 to 75. The equivalent weight of the ionic component is the precursor molecular weight divided by the number of ionic groups. Accordingly, the proportion of (iii) employed divided by its equivalent weight and multiplied by 1,000 provides the ultimate milliequivalents of potential and/or ionic groups present in the total prepolymer weight.

The isocyanate terminated prepolymer (A) as noted above is readily prepared using the conventional procedures already incorporated herein. The excess diisocyanate (i) along with the polyol mixture (ii) and the difunctional isocyanate-reactive component (iii) are brought together in any convenient manner, preferably under the exclusion of moisture prior to the actual formation of aqueous dispersion. This is best achieved by reacting the components under an inert gas such as nitrogen or argon. In a preferred embodiment, the isocyanate reactive components of (ii) and (iii) are first thoroughly blended together followed by the excess diisocyanate.

The exact proportion of excess of isocyanate is chosen so that the final polymer properties desired will be obtained. Advantageously, the proportions of (i), (ii) which includes both diol and triol, and (iii) are such that the ratio of isocyanate equivalents to total isocyanate-reactive equivalents in said prepolymer (A) falls in a range of from about 1.1 to about 3, preferably from about 1.2 to 2.

The reaction temperature during prepolymer formation is normally maintained below about 150° C. Generally speaking, the reactants will be heated to a temperature within the range of about 30° C. to about 125° C, preferably about 50° C. to 125° C. In some cases, reaction exotherm will provide heat thereby contributing to these temperature ranges. The presence of a standard polyurethane catalyst in the prepolymer formation may be desirable. The catalyst will speed up the prepolymer formation and may allow better control of the process.

Solvents may be used during the prepolymer formation but one of the benefits of the present invention is eliminating their use. If, for whatever reason, a solvent is to be employed, then any of those recommended in the incorporated references can be employed.

In respect of the neutralization, quaternarization or ternarization step, whatever the case may be, it is preferred to carry it out after the prepolymer has been formed, and, most preferably, before the aqueous dispersion is prepared. The reason for the latter preference is the more facile formation of the dispersion once the ionic groups are present in the prepolymer. It is the hydrophilicity of the ionic groups which give rise to the good aqueous dispersibility of the prepolymer. Therefore, the neutralizing acid, base, alkylating agent, or whatever as required to convert the potential ionic group to its ionic form is added to the rapidly stirred prepolymer in sufficient amount to react with at least about 40 percent, preferably at least about 90 percent of the potential ionic moieties The aqueous dispersions are now easily formed simply by mixing the prepolymer with the water, preferably under conditions of rapid stirring or agitation. The concentration of prepolymer in the aqueous dispersion is governed primarily by whatever is expedient in the handling of increased volumes. However, the prepolymer is advantageously present in a concentration of from about 10 percent to about 50 percent by weight based on prepolymer and water. Preferably, its concentration is from about 25 to about 40 percent. These proportions should not be regarded as critically limiting for depending on prepolymer properties and the types of ionic groups involved, concentrations falling outside these ranges can be observed.

It will be understood by those skilled in the art that aqueous dispersions of isocyanate terminated prepolymers are not stable for long periods. Accordingly, the lapse of time between preparation of the prepolymer dispersion and the final polymer forming step should be kept to a minimum. Notably, the prepolymer dispersions in accordance with the present invention enjoy good stability both in regard to their dispersion properties (no separation or settling of solids or liquids) and their lack of reactivity between the isocyanate groups and the water. Stability of the present dispersions may be observed for periods of up to about two hours. However, to ensure full isocyanate concentration, the polymer curing step is preferably initiated within about 15 minutes of formation of the prepolymer dispersion.

Completion of the polyurethane-urea formation, otherwise known as chain extension is readily accomplished either by mixing the prepolymer dispersion with the chain extender neat or in the form of a solution in an organic solvent or water or by contacting the prepolymer dispersion with a catalyst which facilitates the chain extension of the prepolymer by water. Efficient intermixing of the components is highly desirable when dealing with organic dispersions in water. Accordingly, the mixing should be conducted at high stirring speeds using efficient paddles or stirring blades. If the extender is reasonably water soluble, it is preferable that it be so employed as an aqueous solution. Any sequence of addition using aqueous solutions or additional pure water to adjust final dispersion concentration is possible during the prepolymer extension step. In this regard, the weight percent of dispersed polymer can be in any amount deemed appropriate for any particular situation or ultimate application Conveniently, it can be present in the same percentage proportions set forth above for the dispersed prepolymer.

This chain extension will, for the most part, occur at ambient room temperatures, i.e. 25° C. to 30° C. In some cases, an exotherm may call for actual cooling. Although, the presence of the aqueous dispersant acts as a heat-sink to modify reaction exotherms. The reaction is generally conducted within a temperature range of from about 5° C. to 90° C., preferably from about 20° C. to 60° C. Mixing is continued until the reaction is judged to be complete. The completion is easily determined using conventional analytical procedures for measuring the disappearance of the extender and/or isocyanate groups such as by infrared measurements, gas phase chromatography, gel permeation chromatography, and the like.

The preferred extenders (B) are defined above as the class of hydrocarbon polyamines. The amine groups can be primary or secondary or a mixture of both in the same molecule. Preferably, the amine functionality falls within a range of from about 2 to about 4, including average values within this range arising from mixtures of polyamines. Preferred as a class are the hydrocarbon diamines wherein the amine functions are primary.

Illustrative but non-limiting of the polyamines are ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 2,2,4-trimethylhexamethylenediamine-1,6, 2,4,4-trimethylhexamethylenediamine-1,6, diethylene triamine, triethylene tetramine, iminobispropylamine, and the like: 1,2-cyclohexylenediamine, 1,3-cyclohexylenediamine, 1,4-cyclohexylenediamine, 4,4'-isopropylidenebis(cyclohexyl amine), 4,4'-diaminodicyclohexyl, methylenebis(cyclohexylamine) including the 4,4'-isomer, the 2,4'-isomer and mixtures thereof including all their geometric isomers, 1-amino-3aminomethyl-3,5,5-trimethylcyclohexane, and the like; 1,3-phenylenediamine, 1,4-phenylenediamine, 2,4-toluenediamine, 2,6-toluenediamine, 4,4'-methylenebis(phenyl amine), 2,4'-methylenebis(phenyl amine), 4,4'-diaminobenzidine, 3,3'-diaminobenzidine, polymethylene polyphenylene amines, and the like. Hydrazines may also be used.

More preferred as a class of extenders are those falling within the alkylene diamines, most particularly the alkylene diamines of $C_2$ to $C_8$ as exemplified above.

The proportion of amine extender (B) employed is governed by the isocyanate content of the prepolymer component. Generally speaking, the proportions of (B) are such that the ratio of isocyanate equivalents in (A) to amine equivalents in (B) falls in a range of from about 1.25 to about 0.90, and, preferably from about 1.10 to 0.95.

In the embodiment wherein the water is the chain extender, the catalyst used to facilitate the chain extension can be any catalyst known in the art for polyurethane formation. Examples of preferred catalyst include organometallic catalysts, especially organotin catalysts, and tertiary amine compounds. The preferred organotin catalysts include, for example, stannous octoate, dimethyltindilaurate, dibutyltindilaurate and the like. Suitable tertiary amine catalysts include triethylenediamine. About 0.001 to about 0.5 part of the organometallic catalyst is advantageously used per 100 parts of reactive components. Tertiary amine catalysts are suitably employed in an amount from about 0.01 to about 2 parts per 100 parts of reactive components.

The resulting aqueous dispersions of ionic polyurethane-ureas in accordance with the present invention can vary from milky to nearly clear in their visual appearance. The dispersions or emulsions are sometimes referred to as latexes. They are characterized by excellent stabilities allowing them to be stored for long periods which vary depending on such factors as ionic content (hydrophilicity), storage temperatures, molecular weights in the soft segments, and the like. Generally speaking, the dispersions can be stored for days and transported within this period without showing any signs of separating or gelling.

The physical properties of the final polymers obtained whether in the form of films, coatings, or even stoving lacquers can vary from those of soft elastomers to harder thermoplastics and all the way to hard thermoset types depending on the polymer components and proportions. Using amine extenders of functionality greater than 2 in combination with prepolymers having the highest isocyanate contents results in the harder thermosets due to the high hard segment content of the polymer and cross-linking. This is particularly true when the soft segments in the prepolymer are derived from the lowest molecular weight polyols. The terms "soft and hard segments" refer to the polymer linkages derived from the diisocyanate component with the high molecular weight polyols (ii) and with the extender (iii) respectively. Reversing all of the above conditions leads to the softer materials.

The polymer dispersions can be modified further by the addition of colorants, latent curing agents, antioxidants, UV stabilizers, fillers, fire-retardants, antistatic agents and the like.

Various kinds of substrates can be coated with films from these aqueous dispersions. After the aqueous dispersions are brushed, sprayed, poured, applied by dip-coating, dip-coagulation, doctor-knife, or otherwise applied to a substrate such as woven and non-woven textiles, leather, paper, wood, metals, ceramics, fibers, plastics such as polycarbonates, acrylics, polyamides, polyurethanes, polyesters, polystyrenes, acrylonitrile/butadiene/styrene copolymers, polyethylenes, (high, low and ultralow densities), rubbers including natural and synthetic, and the like, the water is removed by conventional drying methods.

Drying can be carried out either at ambient room temperatures (e.g., 20° C.) or at elevated temperatures, for example, from about 25° C. to about 150° C., optionally under forced-draft or vacuum. This includes the drying of static substrates in ovens such as forced-air and vacuum ovens: or continuously conveying the coated substrates through chambers heated by forced air, high intensity lamps, and the like or under reduced pressures.

In the preparation of free standing films, the techniques particular to this art are readily applied. For example, the aqueous dispersion can be poured into the appropriate mold, or applied by doctor-knife to a metal or glass plate. Thereafter, the water can be removed in stages using a series of different temperatures with optional use of vacuum. Generally speaking, it is preferred to initially remove the major amount (up to 25 percent) of the water under forced air conditions and at low temperatures (e.g., 20° C. to 30° C.). If the film has enough structural integrity at this stage, it can be hung or optionally oriented by placing under tension in the appropriate frame while the remaining water is removed, preferably at an elevated temperature, for example, from about 50° C. to about 150° C. Final conditioning of the film can be completed under controlled conditions of heat and humidity.

The films in accordance with the present invention whether deposited on a substrate or made as free standing films can be prepared in any desired thickness. Typically, the films can have a thickness of from about one mil to about 50 mils.

The excellent properties of the films include good clarity, high gloss, good weather resistance including water repellency, abrasion resistance, and the like. This makes them particularly useful in the manufacture of waterproof clothing, tarpaulins, chip-resistant coatings in automotive applications such as protective coatings applied after a car has been painted, as coatings for high grade paper, and the like. The present films provide excellent protective coatings on aircraft acrylic canopies and in ballistic glazing applications.

Figure 1:
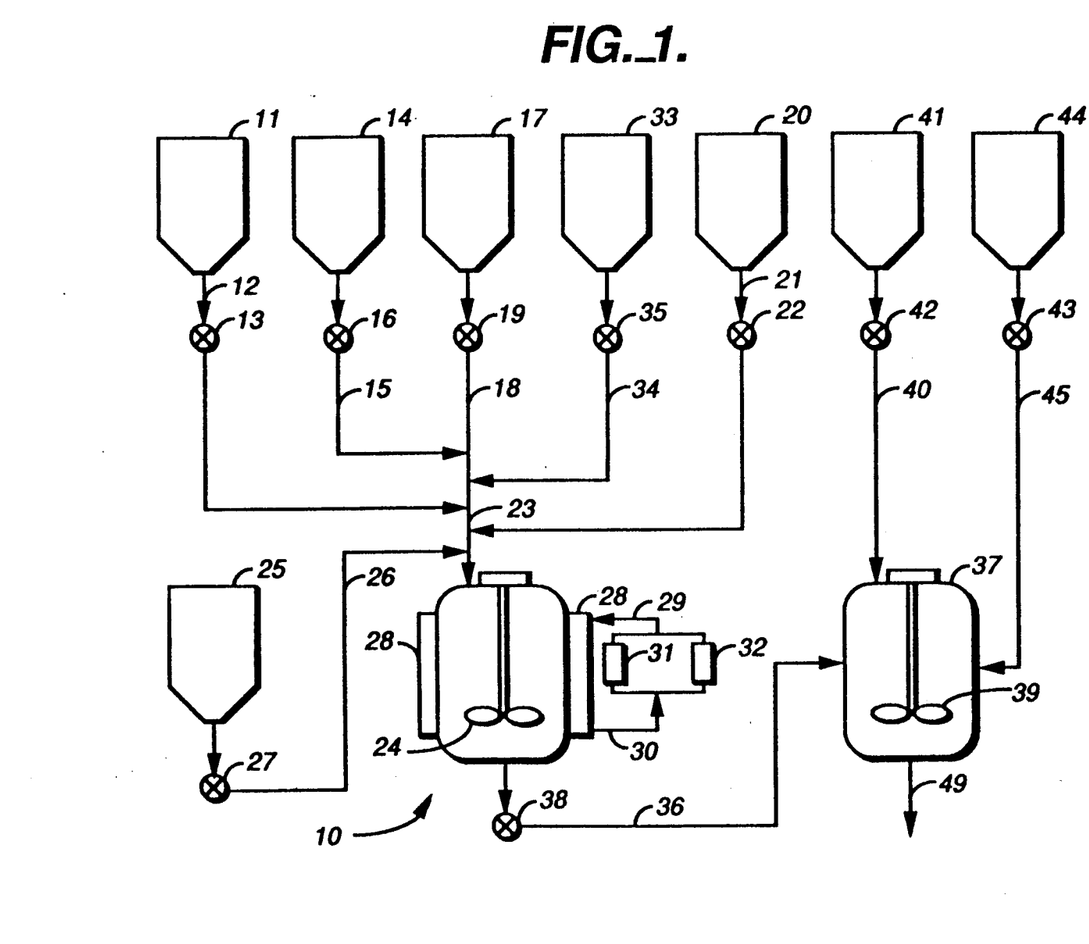
FIG. 1 demonstrates an embodiment of the process described herein, wherein a first batch reactor is used for prepolymer formation and a second reactor is used for polyurethane-urea ionomer formation.

The figures illustrate several embodiments of the invention described herein. In FIG. 1, one embodiment is shown where a separate batch reactor is used for prepolymer formation, and a second batch reactor is used to form polyurethane-urea ionomer. To a prepolymer reactor (10) is fed a polyether diol, a polyether triol, a difunctional isocyanate reactive component containing an ionic group, and a diisocyanate. The polyether diol is transferred from a diol holding tank (11) via transfer line (12). The flow of the diol to the prepolymer reactor is controlled by valve (13). The triol is transferred from a triol holding tank (14) via a transfer line (15), with the flow controlled by a valve (16). The diisocyanate reactive compound with an ionic group is transferred from the holding tank (17) via a transfer line (18), where the flow is controlled by a valve (19). The diisocyanate is transferred from diisocyanate holding tank (20) via a transfer line (21), where the flow is controlled by valve 22. The various reactants flow via the transfer lines described (12), (15), (18) and (21) to a prepolymer reactor feed line (23), which introduces the reactants to the prepolymer reactor (10). The prepolymer reactor (10) has an agitator (24) to insure mixing. In those situations where the use of catalyst is desirable to speed up the prepolymerization, the catalyst is transferred from the catalyst holding tank (25) via a transfer line (26). The flow of catalyst is controlled by a valve (27). The prepolymer reactor is jacketed with a heat exchange means (28) the heat exchange means, is connected via a heat exchange fluid feed line (29) and a heat exchange fluid return line (30) to a source of steam (31) and cooling water (32). Once the reactants have been charged to the prepolymer reactor (10), and mixing has been started, the temperature of the prepolymer reactor (10) is adjusted by the heat exchange means (28), usually the temperature is raised. The prepolymerization reaction is allowed to take place until substantially complete. A valve (35) is opened to allow the neutralizing agent to be transferred from the neutralizing agent holding tank (33) via transfer line (34) to the feed line (23) and thus the feeding of the neutralization agent to the prepolymer reactor. During neutralization it is often desirable for the prepolymer reactor (11) to be cooled by passing cooling water through the heat exchange means (28) surrounding the reactor. Once the prepolymer is neutralized the prepolymer is transferred via transfer line (36) to a second reactor (37), where such flow is controlled by a valve (38). The second reactor (37) is adapted for dispersion of the prepolymer. The second reactor (37) has an agitator (39) for mixing the contents. After the prepolymer has been charged, water is added via line (40) from water holding tank (41). The flow of water is controlled by a valve (42). Water is added to the second reactor (37) until a prepolymer in water dispersion with the desired particle size is formed. Thereafter, valve (43) is opened to allow the transfer of chain extender from the chain extender holding tank (44) via a transfer line (45) to the second reactor (37). The prepolymer dispersion and chain extender are contacted in the second reactor (37) with mixing for a period of time sufficient for the chain extension to go to completion. Once the chain extension is complete, the product is removed from the second reactor via transfer line (49). Once the prepolymer has left the prepolymer reactor, and while the prepolymer which has been transferred to the second reactor (37) is being dispersed in water and chain extended. Another batch of prepolymer is being formed in the prepolymer reactor (10) as described before.

Figure 2:
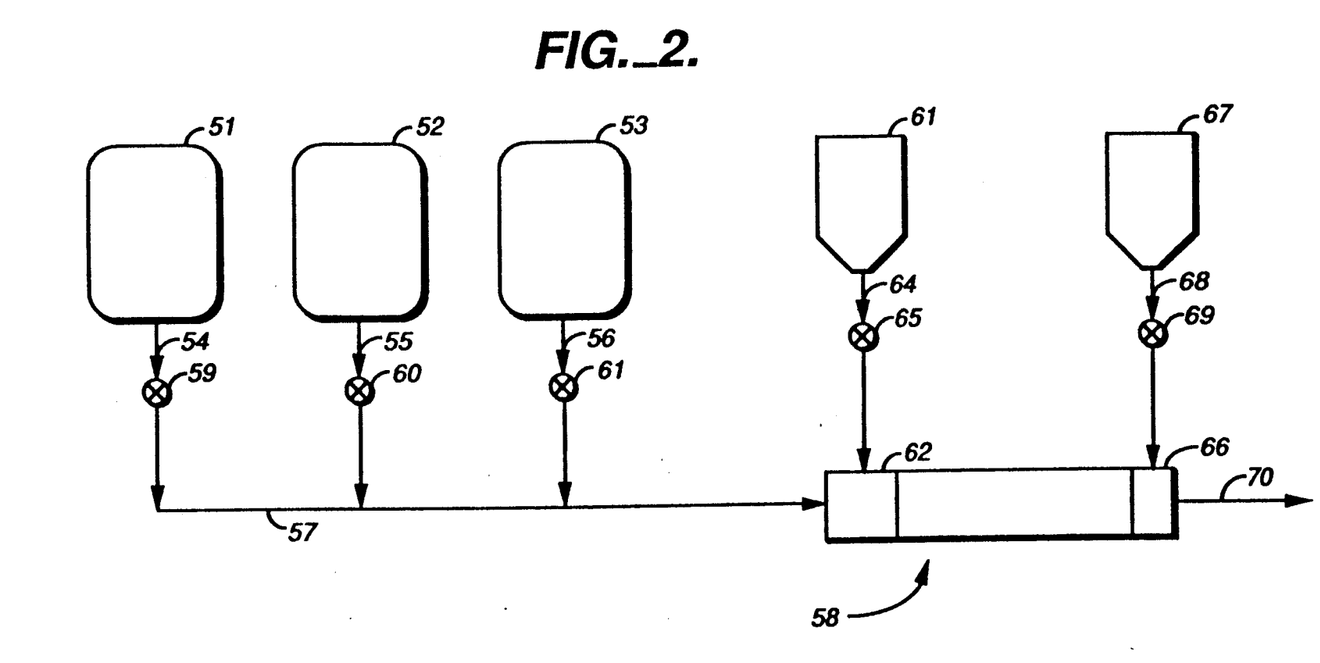
FIG. 2 illustrates an embodiment wherein three batch prepolymer reactors sequentially feed prepolymer to a continuous reactor where water dispersion and chain extension occur.

FIG. 2 illustrates an embodiment wherein three batch prepolymer reactors sequentially feed prepolymer to a continuous reactor where the water dispersion and chain extension takes place. In the figure prepolymer is formed in a sequential manner in reactors (51), (52) and (53) respectively. The prepolymer is transferred via transfer lines (54), (55) and (56) respectively in a sequential manner to a feed line (57) such that the feed line (57) can continuously feed to the continuous reactor (58). The flow of prepolymer to the feed line (57) is controlled via valves (59), (60) and (61) respectively. The prepolymer is introduced into the second reactor (58) through which it flows continuously. In a first zone (62) of the second reactor water is added with mixing to form an emulsion. The water is transferred from a water holding tank or source (63) via a transfer line (64), where the flow to the second reactor (58) is controlled by a valve (65). The prepolymer dispersion flows through the second reactor to a second zone (66) wherein the chain extender is added to the flowing prepolymer with mixing. The chain extender is transferred from a chain extender holding tank (67) via a transfer line (68) where the flow of chain extender is controlled by a valve (69). The product is removed via line (70) from the second reactor. The prepolymer reactors may be set up as described in FIG. 1.

Figure 3:
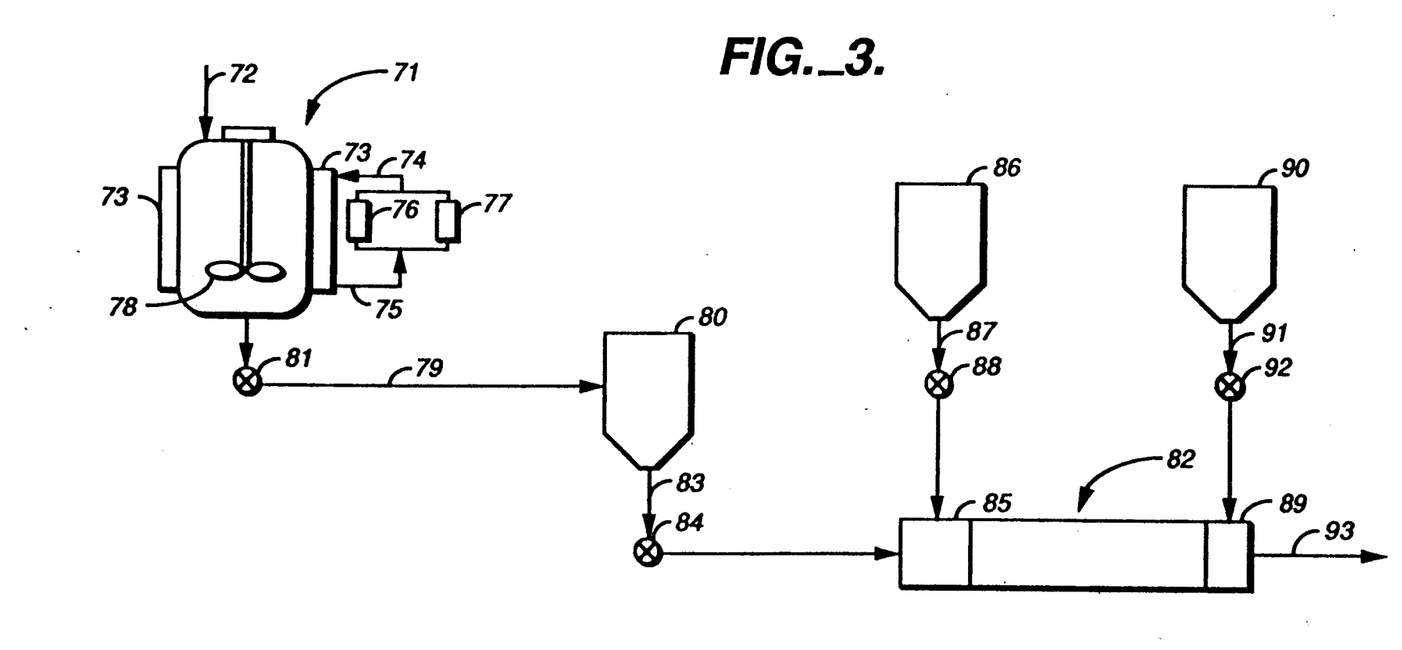
FIG. 3 demonstrates the embodiment wherein there is one prepolymer reactor, a prepolymer holding tank and a second reactor for water dispersion and chain extension.

FIG. 3 demonstrates the embodiment wherein there is one prepolymer reactor, a prepolymer holding tank adapted for holding prepolymer before it is introduced to the second reactor, and a second reactor for water dispersion and chain extension which is continuous. Referring to FIG. 3, a first reactor (71) adapted for formation of a prepolymer, is shown with a feed line 72 through which the reactants are introduced. The reactor has a heat exchange means (73) around it which is connected via a heat exchange introduction line (74) and heat exchange fluid return line (75) to a source of steam (76) and a source of cooled water (77). The prepolymer reactor (71) contains an agitator (78). The prepolymer reactor (71) is connected to a transfer line (79) adapted for transferring formed prepolymer to a prepolymer holding tank (80). The flow of prepolymer to the holding tank is controlled by a valve (81). The prepolymer holding tank (80) is adapted for holding the prepolymer before introduction of the prepolymer into the continuous reactor (82) while more prepolymer is formed in the prepolymer reactor (71). The prepolymer is transferred via line (83) to the continuous reactor (82). The flow of prepolymer is controlled by valve (84) in a manner such that a continuous flow of prepolymer is fed to the continuous reactor (82). In the first zone (85) of the continuous reactor the water is added to the flowing prepolymer to form an aqueous dispersion. The water is transferred from a water holding tank or source (86) via a transfer line (87) where the flow is controlled via a valve (88). The prepolymer dispersion is flowed to a second zone (89) where the chain extender is added to the flowing aqueous dispersion. The chain extender is transferred from a chain extender holding tank (90) via a transfer line (91) where the flow is controlled by a valve (92). The product is removed from the second reactor (82) via line (93).

Figure 4:
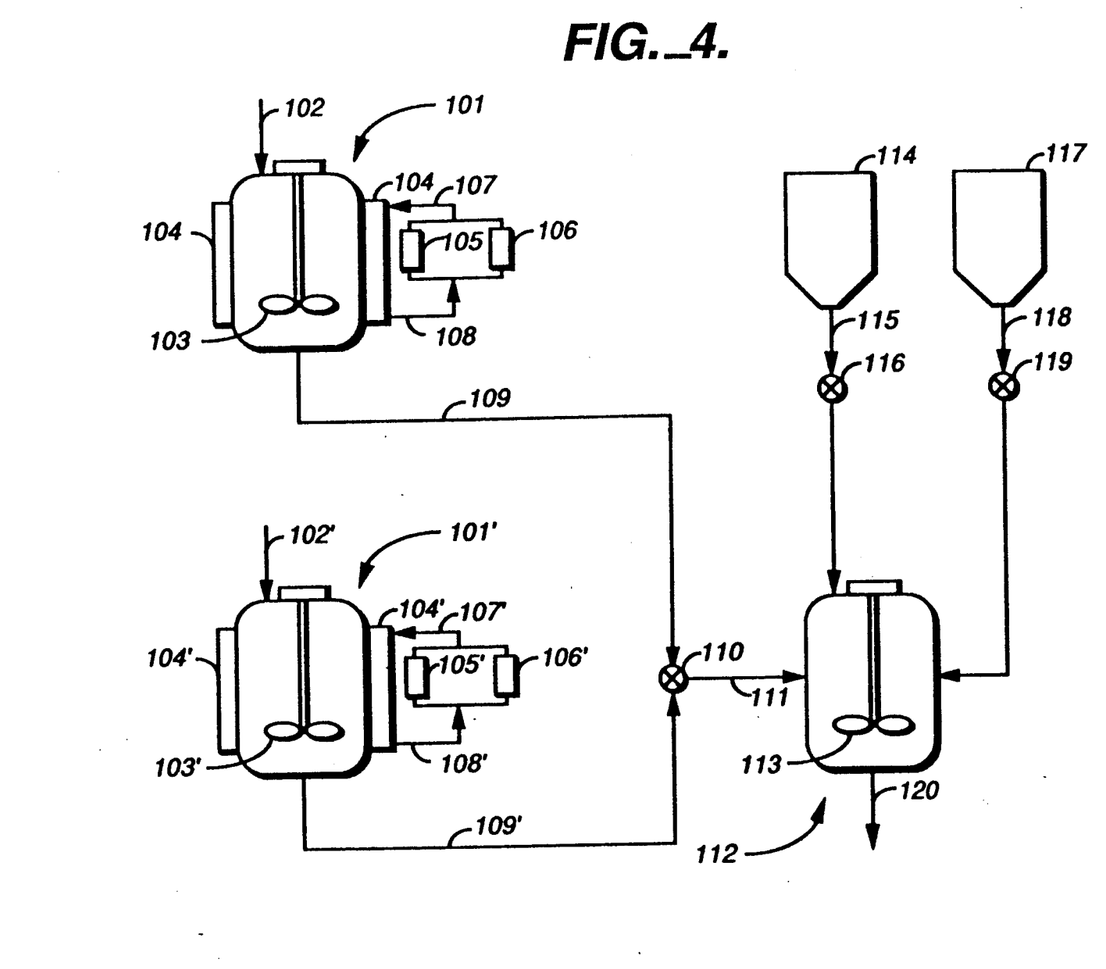
FIG. 4 illustrates the embodiment in which two prepolymer batch reactors sequentially feed one reactor designed for water dispersion and chain extension.

FIG. 4 illustrates the embodiment in which two prepolymer batch reactors sequentially feed one reactor designed for prepolymer dispersion and chain extension. In FIG. 4 there are illustrated two prepolymer reactors (101, 101') each have a feed line (102, 102') for introduction of reactants to the prepolymer reactors (101, 101'). Each reactor is equipped with an agitator (103, 103') and a heat exchange means (104, 104'), which is connected to a steam source (105, 105') and cooling water source (106, 106') via a heat exchange fluid introduction line (107, 107') and a heat exchange fluid return line (108, 108'). After formation of the prepolymer as described in the discussion of FIG. 1, the prepolymer is sequentially transferred via transfer lines (109, 109') from the reactors (101, 101'). The transfer lines (109, 109') are connected to a valve (110) which controls the flow of the prepolymer from the prepolymer reactors (101, 101') to a feed line (111) which introduces prepolymer to a third batch reactor (112) adapted for water dispersion and chain extension of the prepolymer. After a batch of prepolymer is charged to the third reactor, agitation is started or continued using an agitator (113). The water is transferred from a water holding tank or source (114) via a line (115) where the flow is controlled by a valve (116). The water is added to form an aqueous dispersion of the prepolymer. Thereafter, a chain extender is added by transferring it from a chain extender holding tank (117) via a line (118) which is controlled by a valve (119). The product is removed via a line (120). The timing of the charges to the prepolymer reactors is such that a flow of prepolymer to the third reactor is available as the reactions in such reactors are completed. The prepolymer formation is the rate limiting step.

What is claimed is:

1. A semi-continuous process for the preparation of polyurethane ionomer or polyurethane-urea ionomer aqueous dispersions which comprises:
    A. in a first reaction zone contacting (i) a diisocyanate, (ii) an organic polyol, and (iii) a difunctional isocyanate-reactive component containing an ionic group or potential ionic group, under conditions such that an isocyanate terminated ionic prepolymer is formed;
    B. transferring the prepolymer to a second reaction zone:
    C. in the first reaction zone or the second reaction zone contacting the prepolymer with a neutralizing agent under conditions such that the ionic groups are neutralized;
    D. adding water to the second reaction zone until a prepolymer in water emulsion with a particle size of from about 300Å to about 10,000Å is formed:
    E. adding to the second reaction zone a hydrocarbon polyamine extender, a solution of a hydrocarbon extender, or a catalyst which facilitates the chain extension of the prepolymer by water, under conditions such that a polyurethane or polyurethane-urea ionomer is formed: and
    F. removing the polyurethane or polyurethane-urea ionomer from the second reaction zone.

2. The process of claim 1 wherein the diisocyanate is aliphatic or cycloaliphatic.

3. The process of claim 2 wherein the prepolymer is contacted with a neutralizing agent in the first reaction zone.

4. The process of claim 3 wherein the prepolymer is chain extended with a hydrocarbon polyamine extender under conditions such that a polyurethane-urea ionomer aqueous dispersion is formed.

5. The process of claim 4 wherein the (i) excess of an aliphatic or cycloaliphatic diisocyanate, (ii) organic polyol, and (iii) difunctional isocyanate-reactive component containing an ionic group or potential ionic group are contacted for between about 20 and about 150 minutes.

6. The process of claim 5 wherein the (i) excess of an aliphatic or cycloaliphatic diisocyanate, (ii) organic polyol, and (iii) difunctional isocyanate-reactive component containing an ionic group or potential ionic group are contacted in the presence of a polyurethane catalyst.

7. The process of claim 6 wherein the temperature (i) excess of an aliphatic or cycloaliphatic diisocyanate, (ii) organic polyol, and (iii) difunctional isocyanate-reactive component containing an ionic group or potential ionic group are contacted at between about 20° and about 100° C.

8. The process of claim 7 wherein water is added to the prepolymer in the second reaction zone at a temperature of between about 20° and about 100° C.

9. A semi-continuous process for the preparation of polyurethane ionomer or polyurethane-urea ionomer aqueous dispersions which comprises:
    A. in two or more reaction zones adapted for preparing an isocyanate terminated ionic prepolymer contacting (i) an excess of a diisocyanate, (ii) an organic polyol, and (iii) a difunctional isocyanate-reactive component containing an ionic group or potential ionic group under conditions such that an isocyanate terminated ionic prepolymer is formed:
    B. sequentially transferring the neutralized prepolymer from the two or more reaction zones adapted for preparing an isocyanate terminated ionic prepolymer to a reaction zone adapted for preparing a polyurethane polyurethane-urea ionomer aqueous dispersion under conditions that the latter reaction zone continuously forms polyurethane-urea ionomer aqueous dispersions;

C. in the two or more reaction zones adapted for preparing an isocyanate terminated ionic prepolymer contacting the prepolymer with a neutralizing agent under conditions such that the ionic groups are neutralized:

D. adding water to the reaction zone adapted for preparing a polyurethane-urea ionomer aqueous dispersion until a prepolymer in water emulsion with a particle size of from about 300Å to about 10,000Å is formed:

E. adding to the reaction zone adapted for preparing a polyurethane-urea ionomer aqueous dispersion, a hydrocarbon polyamine extender, a solution of a hydrocarbon extender, or a catalyst which facilitates the chain extension of the prepolymer by water, under conditions such that a polyurethane-urea or polyurethane ionomer is formed; and F. removing the polyurethane or polyurethane-urea ionomer from the reaction zone adapted for preparing a polyurethane-urea ionomer aqueous dispersion.

10. The process of claim 9 wherein the diisocyanate is aliphatic or cycloaliphatic.

11. The process of claim 10 wherein the prepolymer is contacted with a neutralizing agent in the two or more reaction zones adapted for preparing an isocyanate terminated ionic prepolymer.

12. The process of claim 11 wherein the prepolymer is chain extended with a hydrocarbon polyamine extender under conditions such that a polyurethane urea ionomer aqueous dispersion is formed.

13. The process of claim 12 wherein the (i) excess of an aliphatic or cycloaliphatic diisocyanate, (ii) organic polyol, and (iii) difunctional isocyanate-reactive component containing an ionic group or potential ionic group are contacted for between about 20 and about 150 minutes.

14. The process of claim 13 wherein the (i) excess of an aliphatic or cycloaliphatic diisocyanate, (ii) organic polyol, and (iii) difunctional isocyanate-reactive component containing an ionic group or potential ionic group are contacted in the presence of a polyurethane catalyst.

15. The process of claim 14 wherein the (i) excess of an aliphatic or cycloaliphatic diisocyanate, (ii) organic polyol, and (iii) difunctional isocyanate-reactive component containing an ionic group or potential ionic group are contacted at between about 20° and about 90° C.

16. The process of claim 10 wherein water is added to the prepolymer in the second reaction zone at a temperature of between about 20° and about 100° C.

17. A semi-continuous process for the preparation of a polyurethane or polyurethane-urea ionomer aqueous dispersion which comprises:

A. in one or more reaction zones adapted for preparing an isocyanate terminated ionic prepolymer contacting (i) an excess of a diisocyanate, (ii) an organic polyol, and (iii) a difunctional isocyanate-reactive component containing an ionic group or potential ionic group, under conditions such that an isocyanate terminated ionic prepolymer is formed;

B. sequentially transferring the prepolymer from the reaction zones adapted for preparing an isocyanate terminated ionic prepolymer to a plug flow reaction zone adapted for preparing an aqueous dispersion of the prepolymer under conditions such that prepolymer is continuously fed to such reaction zone:

C. in the reaction zones adapted for preparing an isocyanate terminated ionic prepolymer or in a zone of the plug flow reaction zone contacting the prepolymer with a neutralizing agent under conditions such that the ionic groups are neutralized:

D. adding water to the reaction zone adapted for preparing the prepolymer aqueous dispersion until a prepolymer in water emulsion with a particle size of from about 300Å to about 10,000Å is formed;

E. flowing the prepolymer aqueous dispersion to a reaction zone adapted for preparing a polyurethane or polyurethane-urea ionomer aqueous dispersion:

F. adding a hydrocarbon polyamine extender, a solution of a hydrocarbon extender, or a catalyst which facilitates the chain extension of the prepolymer by water to the reaction zone adapted for preparing a polyurethane or polyurethane-urea ionomer aqueous dispersion under conditions such that a polyurethane-urea or polyurethane ionomer aqueous dispersion is formed; and G. removing the polyurethane or polyurethane-urea ionomer aqueous dispersion from the reaction zone adapted for preparing the polyurethane or polyurethane-urea ionomer aqueous dispersion.

18. The process of claim 17 wherein the diisocyanate is aliphatic or cycloaliphatic.

19. The process of claim 18 wherein the prepolymer is contacted with a neutralizing agent in the reaction zones adapted for preparing an isocyanate terminated ionic prepolymer.

20. The process of claim 19 wherein the prepolymer is chain extended with a hydrocarbon polyamine extender under conditions such that a polyurethane-urea ionomer aqueous dispersion is formed.

21. The process of claim 20 wherein the (i) excess of an aliphatic or cycloaliphatic diisocyanate, (ii) organic polyol, and (iii) difunctional isocyanate-reactive component containing an ionic group or potential ionic group are contacted for between about 20 and about 150 minutes.

22. The process of claim 21 wherein the (i) excess of an aliphatic or cycloaliphatic diisocyanate, (ii) organic polyol, and (iii) difunctional isocyanate-reactive component containing an ionic group or potential ionic group are contacted in the presence of a polyurethane catalyst.

23. The process of claim 22 wherein the (i) excess of an aliphatic or cycloaliphatic diisocyanate, (ii) organic polyol, and (iii) difunctional isocyanate-reactive component containing an ionic group or potential ionic group are contacted at between about 20° and about 90° C.

24. The process of claim 23 wherein water is added to the prepolymer in the reaction zone adapted for preparing the prepolymer aqueous dispersion at a temperature of between about 20° and about 100° C.

25. The process of claim 24 wherein hydrocarbon polyamine is added to the prepolymer in the reaction zone adapted for preparing polyurethane-urea ionomer aqueous dispersion at a temperature of between about 20° and about 100° C.

26. The process of claim 25 wherein the residence time of the prepolymer in the reaction zone adapted for preparing the prepolymer aqueous dispersion is between about 30 seconds and about 30 minutes.

27. The process of claim 26 wherein the residence time of the aqueous dispersion in the reaction zone adapted for preparing the polyurethane-urea ionomer aqueous dispersion is between about 30 seconds and about 5 minutes.

* * * * *